United States Patent

Holzmann et al.

[15] 3,678,666

[45] July 25, 1972

[54] BRANCH GUIDE FOR A BERRY HARVESTING MACHINE

[72] Inventors: Paul Holzmann, Rte. 3, Box 151, South Haven, Mich. 49090

[22] Filed: March 26, 1971

[21] Appl. No.: 128,316

[52] U.S. Cl. .................................... 56/119, 56/330
[51] Int. Cl. ............................................ A01d 73/00
[58] Field of Search ............ 56/119, 330, 94, 98, 56, 59, 63

[56] References Cited

UNITED STATES PATENTS

| 322,459 | 7/1885 | Lewis et al. ........................ 56/98 |
| 689,744 | 12/1901 | Perry et al. ...................... 56/119 X |
| 2,777,267 | 1/1957 | Thompson ...................... 56/119 X |

*Primary Examiner*—Louis G. Mancene
*Assistant Examiner*—J. N. Eskovitz
*Attorney*—Gordon W. Hueschen and Talivaldis Cepuritis

[57] ABSTRACT

A branch guide is mounted in front of the harvesting machine and comprises a combination of a forwardly-inclined conveyor and rotating, circumferentially spaced tines. The conveyor picks up and elevates berry-laden branches in engagement with the tines which, in turn, deflect the branches into the harvesting machine.

6 Claims, 4 Drawing Figures

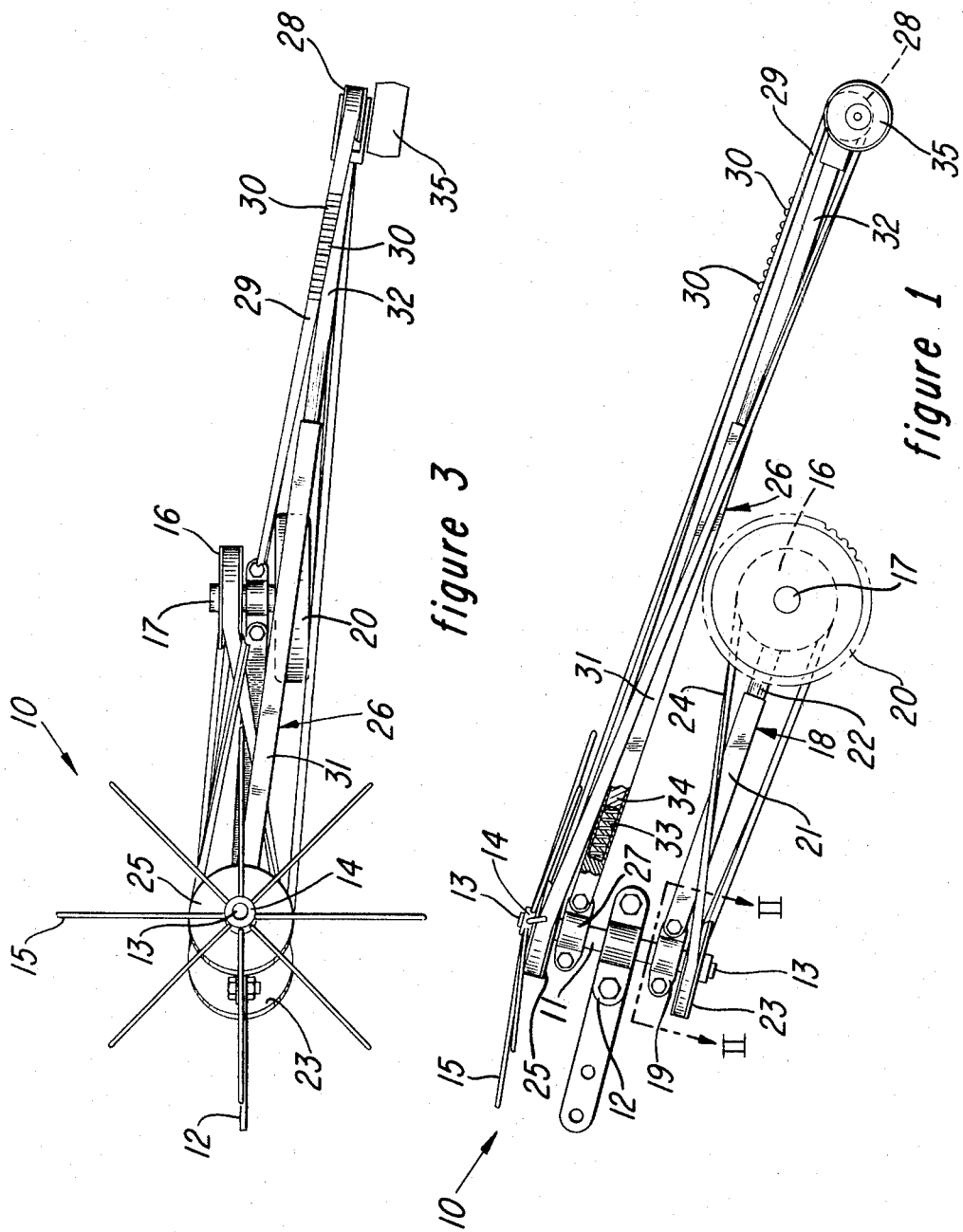

Patented July 25, 1972

INVENTOR.
PAUL HOLZMANN
BY
ATTORNEYS

BRANCH GUIDE FOR A BERRY HARVESTING MACHINE

BACKGROUND OF THE INVENTION

This invention relates to a berry harvesting machine. More particularly, this invention is directed to an attachment for berry harvesting machines such as, for example, the machine disclosed and claimed in U.S. Pat. No. 3,420,045.

When harvesting berries with mechanical equipment, quite often the equipment brushes against berry-laden branches and knocks off the berries before the branches can be placed in position over a suitable receptacle means. Moreover, when a bumper crop is experienced, the weight of the berries forces the branches of a berry-bearing bush close to the ground thereby making it difficult for mechanical harvesting equipment to gather in the berries from the lowermost branches. Moreover, ripe berries are readily shaken loose from the branches, thus care must be exercised in handling berry-laden branches prior to the removal of berries therefrom.

It is an object of this invention to provide an attachment for a berry harvesting machine which will elevate berry-laden branches and deflect such branches into the machine without substantially disturbing the berries thereon.

Still other objects within the spirit and scope of this invention will readily present themselves to one skilled in the art upon reference to the ensuing specification, the drawings, and the claims.

SUMMARY OF THE INVENTION

The present invention contemplates a branch guide for a berry harvesting machine which is adapted to be mounted in front of the machine. The present branch guide comprises an upstanding, forwardly inclined tubular housing, a main shaft journaled in said housing, a rotatable hub means which is affixed at the upper end of the journaled shaft, a plurality of outwardly-extending, circumferentially-spaced tines mounted on the hub means, a forwardly-sloping conveyor means which is adapted to receive berry-laden branches and to carry and elevate these branches into engagement with the tines, and a drive means which rotatably drives the main shaft thereby rotating the hub means equipped with the tines. The conveyor means can be driven separately, if desired, or it can be driven from the main shaft with a suitable pulley or chain arrangement.

BRIEF DESCRIPTION OF THE DRAWINGS

In the drawings,

FIG. 1 is a side elevational view of the branch guide of this invention;

FIG. 3 is a top view of the branch guide shown in FIG. 1; and

DESCRIPTION OF THE PREFERRED EMBODIMENTS

Figure 4:
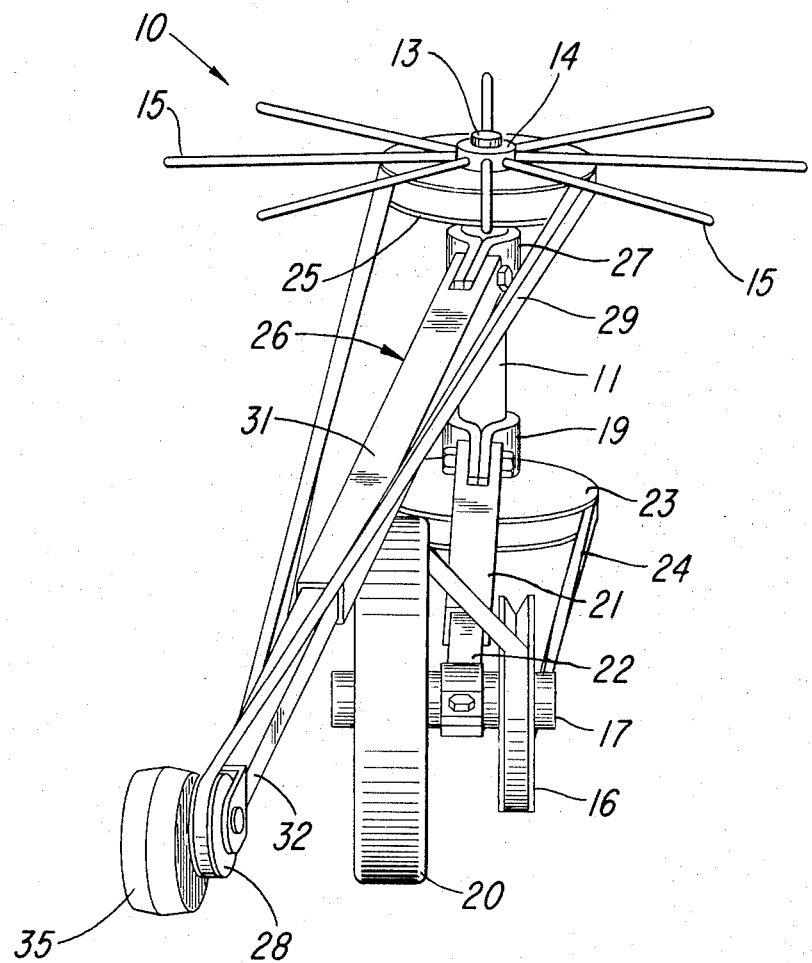
FIG. 4 is a front elevational view of the branch guide shown in FIG. 1.

Referring to FIGS. 1, 3 and 4, branch guide 10 comprises upstanding tubular housing 11 which is forwardly inclined from the vertical. Mounting clamp 12 is attached to housing 11 and can be conveniently affixed to the forward portion of a harvesting machine such as that shown in U.S. Pat. No. 3,420,045, for example. Inasmuch as the harvesting machine straddles the bushes from which the berries are to be gathered, a pair of branch guides 10 is usually utilized, both mounted forward of the harvesting machine, one on the left side and one on the right side thereof. In the FIGURES the mounting guide for the right side is shown. The branch guide to be mounted on the left side is substantially a mirror image of that shown.

Figure 2:
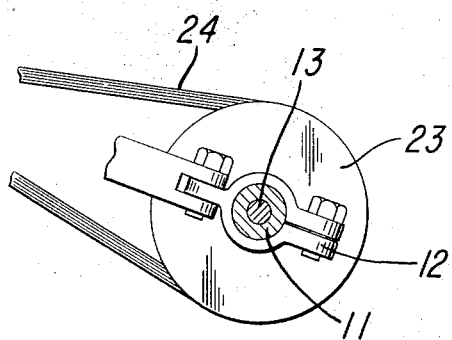
FIG. 2 is a sectional view taken along line II — II in FIG. 1.

Main shaft 13 can be journaled in housing 11 in any convenient manner, for example, as shown in FIG. 2. Rotatable hub means 14 is affixed at the upper end of shaft 13 and is provided with a plurality of circumferentally-spaced, outwardly-extending tines 15. The number of tines can vary depending on the thickness of the branches; however, it is preferred to have at least four tines. Hub 14 and tines 15 are rotated by means of driver pulley 16 which is mounted on the inboard end of shaft 17 journaled at the free end of forwardly extending arm 18 which, in turn, is affixed to housing 11 by clamp 19. Ground engaging wheel 20 is mounted at the outboard end of shaft 17 so that when branch guide 10 is pushed forward wheel 20 will rotate shaft 17 and thus pulley 16 will turn in the same direction. Arm 18 can be rigid; however, in view of the relatively uneven ground that wheel 20 normally traverses, it is preferred to make the arm resiliently telescoping. This can be achieved by means of hollow tubular arm member 21 slidably receiving solid arm member 22 and having compressible spring means situated within hollow member 21 and abutting the innermost end of solid arm member 22. Such an arrangement also aids in maintaining proper tension on belt 24. Driven pulley 23 is fixedly mounted on lower end of shaft 13 and endless belt 24 is arranged over pulleys 16 and 23 substantially at a quarter twist so as to drive shaft 13 in response to rotation of wheel 20.

The forwardly-sloping conveyor means comprises conveyor driver pulley 25 fixedly mounted at the upper end of shaft 13 below hub 14, forwardly-extending conveyor support arm 26 mounted at one end on housing 11 by means of clamp 27, conveyor driven pulley 28 rotatably mounted at the free end of support arm 26 and in a plane substantially normal to the plane of conveyor driver pulley 25, and endless carrier belt 29 which is arranged over pulleys 25 and 28 substantially at a quarter twist so that branches received by belt 29 are carried upwardly toward tines 15. Preferably carrier belt 29 is provided with protuberances 30, or similar anti-slip means, so that branches carried on the belt are not shaken or jarred during their ascent toward tines 15. Preferably support arm 26 is resiliently telescoping in a manner similar to arm 18, i.e., by means of hollow tubular arm member 31 which slidably receives solid arm member 32 therein. Compressible spring means 33 is situated within hollow arm member 31 and abuts innermost end 34 of solid arm member 32. Such an arrangement aids in maintaining the desired tension of carrier belt 29.

In instances where the conveyor means extends substantially to the ground level it is desirable to provide idler wheel 35 rotatably mounted on the outboard side of support arm 26 and at the free end thereof. Wheel 35, when rotatably engaged with ground, can also be utilized to provide drive means for main shaft 13, if desired, by a suitable epicyclical gear train arrangement or the like so that forward rotation of wheel 35 will cause pulley 28 to rotate in the opposite direction at the desired angular velocity. Such an arrangement can dispense with the need for ground-engaging wheel 20 and the pulley arrangement associated therewith for light conveyor duty requirements.

In operation of the aforedescribed branch guide the relative pulley diameters are chosen so as to provide a smooth elevation of the branches by the conveyor means, without a substantial slippage between carrier belt 29 and the branches engaged therewith. The speed at which the berry harvester is pulled or driven is not critical because the hereinabove set forth drive means will automatically adjust the carrier belt speed to the desired value as the speed of the berry harvester varies.

The foregoing discussion and the accompanying drawings are intended as illustrative but are not to be taken as limiting. Still other variations within the spirit and scope of this invention will readily present themselves to one skilled in the art.

I claim:

1. Branch guide for a berry harvesting machine, adapted to be mounted forward on said machine, which comprises:
    an upstanding, forwardly-inclined tubular housing;
    a main shaft journaled in said housing;
    a rotatable hub means affixed at the upper end of said shaft;
    a plurality of outwardly-extending, circumferentially-spaced tines mounted on said hub means;

a forwardly-sloping conveyor means mounted on said housing, driven by said main shaft and comprising a conveyor driver pulley fixedly mounted at the upper end of said main shaft and below said hub means; a conveyor support arm means fixedly mounted at one end thereof on said housing and extending forwardly of said housing; a conveyor driven pulley rotatably mounted at the free end of the conveyor support arm means in a plane substantially normal to the plane of said conveyor driver pulley; and an endless carrier belt arranged over the conveyor driver and driven pulleys substantially at a quarter twist so that the branches received by said carrier belt are carried upwardly toward the tines; and a drive means for rotatably driving said main shaft.

2. The branch guide in accordance with claim 1 wherein the drive means comprises an arm means fixedly mounted at one end thereof on said housing and extending forwardly of said housing;

a driver shaft journaled at the free end of said arms means substantially normal to said main shaft;

a driver pulley fixedly mounted at one end of said driver shaft;

a ground-engaging wheel fixedly mounted at the other end of said driver shaft;

a driven pulley fixedly mounted at the lower end of said main shaft; and an endless belt substantially at a quarter twist arranged over said driver pulley and aid driven pulley.

3. The branch guide in accordance with claim 2 wherein the arm means is resiliently telescoping.

4. The branch guide in accordance with claim 1 wherein the conveyor arm means is resiliently telescoping.

5. The branch guide in accordance with claim 1 wherein the carrier belt is provided with protuberances adapted to receive and carry the branches.

6. The branch guide in accordance with claim 1 wherein an idler wheel adapted for ground engagement is rotatably mounted at the free end of the conveyor arm means.

* * * * *